United States Patent
Mueller-Lerwe et al.

(10) Patent No.: US 11,195,344 B2
(45) Date of Patent: Dec. 7, 2021

(54) HIGH PHONE BLE OR CPU BURDEN DETECTION AND NOTIFICATION

(71) Applicant: Ford Global Technologies, LLC, Dearborn, MI (US)

(72) Inventors: Armin Mueller-Lerwe, Kerpen-Bergerhausen (DE); Gabrielle Jost, Niederzier (DE); Yuliya Aksyutina, Jülich (DE); Ali Hassani, Ann Arbor, MI (US); Erick Michael Lavoie, Dearborn, MI (US); John Robert Van Wiemeersch, Novi, MI (US); Vivekanandh Elangovan, Canton, MI (US); Christoph Hirner, Cologne (DE); Hamid M. Golgiri, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 16/355,143

(22) Filed: Mar. 15, 2019

(65) Prior Publication Data

US 2020/0294325 A1    Sep. 17, 2020

(51) Int. Cl.
    *G07C 5/00*    (2006.01)
    *G07C 5/10*    (2006.01)
    (Continued)

(52) U.S. Cl.
    CPC ............... *G07C 5/008* (2013.01); *G07C 5/10* (2013.01); *H04W 4/40* (2018.02); *H04W 4/80* (2018.02); *H04W 24/06* (2013.01); *H04W 24/10* (2013.01)

(58) Field of Classification Search
    CPC ......... G07C 5/008; G07C 5/10; H04W 24/10; H04W 24/06; H04W 4/40; H04W 4/80
    See application file for complete search history.

(56) References Cited

U.S. PATENT DOCUMENTS

| 5,959,724 A | 9/1999 | Izumi |
| 6,275,754 B1 | 8/2001 | Shimizu |

(Continued)

FOREIGN PATENT DOCUMENTS

| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Mathew Franklin Gordon
(74) *Attorney, Agent, or Firm* — Frank Lollo; Eversheds Sutherland (US) LLP

(57) ABSTRACT

Method and apparatus are disclosed for monitoring of communication for vehicle remote motive control. An example vehicle includes an autonomy unit for remote motive control, a communication module, and a controller. The controller is to send a diagnostic signal to and receive a return signal from a mobile device via the communication module, determine a time period between sending of the diagnostic signal and receipt of the return signal, and prevent the autonomy unit from causing vehicle movement responsive to determining the time period is greater than a threshold.

18 Claims, 7 Drawing Sheets

(51) Int. Cl.
  *H04W 24/06* (2009.01)
  *H04W 24/10* (2009.01)
  *H04W 4/40* (2018.01)
  *H04W 4/80* (2018.01)

(56) References Cited

U.S. PATENT DOCUMENTS

| | | |
|---|---|---|
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 10,974,717 B2 * | 4/2021 | Golgiri ............... B60W 30/06 |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |

(56) References Cited

U.S. PATENT DOCUMENTS

| | | |
|---|---|---|
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |

(56) References Cited

U.S. PATENT DOCUMENTS

| | | | |
|---|---|---|---|
| 2017/0123423 A1 | 5/2017 | Sako | |
| 2017/0129537 A1 | 5/2017 | Kim | |
| 2017/0129538 A1 | 5/2017 | Stefan | |
| 2017/0132482 A1 | 5/2017 | Kim | |
| 2017/0144654 A1 | 5/2017 | Sham | |
| 2017/0144656 A1 | 5/2017 | Kim | |
| 2017/0147995 A1 | 5/2017 | Kalimi | |
| 2017/0168479 A1 | 6/2017 | Dang | |
| 2017/0192428 A1 | 7/2017 | Vogt | |
| 2017/0200369 A1 | 7/2017 | Miller | |
| 2017/0203763 A1 | 7/2017 | Yamada | |
| 2017/0208438 A1 | 7/2017 | Dickow | |
| 2017/0297385 A1 | 10/2017 | Kim | |
| 2017/0297620 A1 | 10/2017 | Lavoie | |
| 2017/0301241 A1 | 10/2017 | Urhahne | |
| 2017/0308075 A1 | 10/2017 | Whitaker | |
| 2017/0336788 A1 | 11/2017 | Iagnemma | |
| 2017/0357317 A1 | 12/2017 | Chaudhri | |
| 2017/0371514 A1 | 12/2017 | Cullin | |
| 2018/0015878 A1 | 1/2018 | McNew | |
| 2018/0024559 A1 | 1/2018 | Seo | |
| 2018/0029591 A1 | 2/2018 | Lavoie | |
| 2018/0029641 A1 | 2/2018 | Solar | |
| 2018/0039264 A1 | 2/2018 | Messner | |
| 2018/0043884 A1 | 2/2018 | Johnson | |
| 2018/0056939 A1 | 3/2018 | van Roermund | |
| 2018/0056989 A1 | 3/2018 | Donald | |
| 2018/0082588 A1 | 3/2018 | Hoffman, Jr. | |
| 2018/0088330 A1 | 3/2018 | Giannuzzi | |
| 2018/0093663 A1 | 4/2018 | Kim | |
| 2018/0105165 A1 | 4/2018 | Alarcon | |
| 2018/0105167 A1 | 4/2018 | Kim | |
| 2018/0148094 A1 | 5/2018 | Mukaiyama | |
| 2018/0174460 A1 | 6/2018 | Jung | |
| 2018/0189971 A1 | 7/2018 | Hildreth | |
| 2018/0194344 A1 | 7/2018 | Wang | |
| 2018/0196963 A1 | 7/2018 | Bandiwdekar | |
| 2018/0224863 A1 | 8/2018 | Fu | |
| 2018/0236957 A1 | 8/2018 | Min | |
| 2018/0284802 A1 | 10/2018 | Tsai | |
| 2018/0286072 A1 | 10/2018 | Tsai | |
| 2018/0339654 A1 | 11/2018 | Kim | |
| 2018/0345851 A1 | 12/2018 | Lavoie | |
| 2018/0364731 A1 | 12/2018 | Liu | |
| 2019/0005445 A1 | 1/2019 | Bahrainwala | |
| 2019/0042003 A1 | 2/2019 | Parazynski | |
| 2019/0066503 A1 | 2/2019 | Li | |
| 2019/0103027 A1 | 4/2019 | Wheeler | |
| 2019/0137990 A1 | 5/2019 | Golgiri | |
| 2019/0152472 A1* | 5/2019 | Aksyutina | G05D 1/0022 |
| 2019/0230471 A1* | 7/2019 | Golgiri | G01S 5/00 |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102010034129 B4 | 2/2012 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017096307 A1 | 6/2017 |

(56) References Cited

FOREIGN PATENT DOCUMENTS

WO     WO 2017096728 A1     6/2017
WO     WO 2017097942 A1     6/2017

OTHER PUBLICATIONS

Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control Via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
Safecharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual V2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

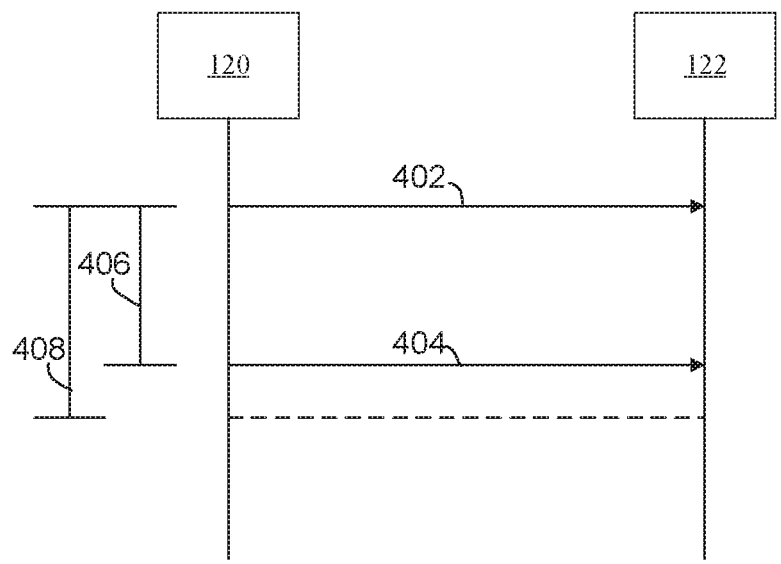
FIG. 4A
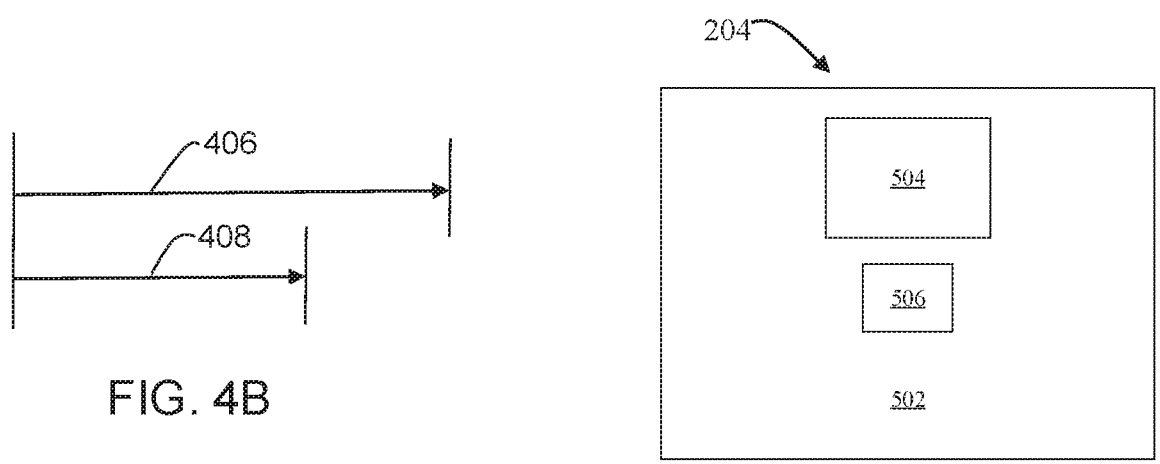
FIG. 4B
FIG. 5

HIGH PHONE BLE OR CPU BURDEN DETECTION AND NOTIFICATION

TECHNICAL FIELD

The present disclosure generally relates to remote motive control and, more specifically, to monitoring of communication for remote motive control of a vehicle.

BACKGROUND

Many vehicles include motive functions that are at least partially autonomously controlled by the vehicle. For example, some vehicles include cruise control in which the vehicle controls acceleration and/or deceleration of the vehicle so that a speed of the vehicle is maintained. Further, some vehicles include adaptive cruise control in which the vehicle controls acceleration and/or deceleration of the vehicle so that a speed of the vehicle and a following distance behind a lead vehicle are maintained. Additionally, some vehicles include park-assist features in which the vehicle autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for monitoring of communication and processing for vehicle remote motive control. An example disclosed vehicle includes a communication module and an autonomy unit comprising an autonomy unit controller configured to send a diagnostic signal including a unique identifier, via the communication module, to a mobile device. The mobile device includes a device controller configured to generate a return signal including the unique identifier upon detecting an input responsive to receipt of the diagnostic signal. Furthermore, the autonomy unit controller is configured to receive the return signal including the unique identifier from the mobile device, via the communication module. The autonomy unit controller determines a time period between sending the diagnostic signal and receiving the return signal, and wherein responsive to a determination that the time period is greater than a threshold, the autonomy unit controller disables the autonomy unit to prevent movement of the vehicle during a remote motive control session of the vehicle.

In some examples, the autonomy unit controller generates a first diagnostic signal time stamp when the diagnostic signal is sent to the mobile device and the autonomy unit controller generates a second diagnostic signal time stamp when the return signal is received form the mobile device. The autonomy unit controller determines the time period between the first diagnostic signal time stamp and the second diagnostic signal time stamp.

In some examples, the communication module is configured to wirelessly communicate via a Bluetooth® low energy protocol, a Classic Bluetooth® protocol, a Wi-Fi® protocol, a Wi-Fi® low power protocol, and an Ultra-Wide Band (UWB) protocol. In some examples, the communication module sends the counter signal to trigger sending of the return signal to the communication module.

In some examples, responsive to determining the time period is less than or equal to a threshold, the autonomy unit controller enables the autonomy unit to cause movement of the vehicle during remote motive control of the vehicle.

In some examples, the controller sends a notification to the mobile device including a plurality of potential sources responsible for the time period being greater than the threshold. In some examples, the notification further includes an acknowledgment input confirming investigation of one or more of the plurality of potential sources responsible for the time period being greater than the threshold, and a confirmation response is received by the autonomy unit controller to trigger sending a second diagnostic signal to the mobile device.

In some examples, after the mobile device detects the input, the device controller is to process a task associated with the input and generate a second return signal. The device controller sends the second return signal to the autonomy unit controller and the autonomy unit controller determines a second time period between receiving the return signal and receiving the second return signal.

In some examples, responsive to determining the second time period is less than or equal to a threshold, the autonomy unity is enabled to cause movement during remote motive control of the vehicle. In some examples, responsive to determining the second time period is greater than a threshold, the autonomy unit is to disabled to prevent movement during remote motive control of the vehicle.

An example disclosed method performed by a vehicle includes sending, via a communication module of a vehicle, a diagnostic signal including a first diagnostic signal time stamp from an autonomy unit controller to a mobile device and detecting, via the mobile device, an input responsive to receipt of the diagnostic signal. The example disclosed method also includes generating, by the mobile device, a return signal including the first diagnostic signal time stamp upon detecting the input. Furthermore, the method includes receiving, via the communication module, the return signal including the first diagnostic signal time stamp by the autonomy unit controller of the vehicle. The example disclosed method also includes generating, by the autonomy unit controller, a second diagnostic signal time stamp upon receiving the return signal. The method further includes determining, by a processor of the autonomy unit controller, a time period between the first diagnostic signal time stamp and the second diagnostic signal time stamp. The example disclosed method further includes disabling, via the processor of the autonomy unit controller, an autonomy unit from causing movement of the vehicle responsive to determining the time period is greater than a threshold.

In some examples, a time of the autonomy unit controller is synchronized with a time of the mobile device. The example disclosed method further discloses, generating, by the mobile device, a first device time stamp upon detecting the input, including the first device time stamp in the return signal, and determining, via the processor of the autonomy unit controller, the time period between the first diagnostic signal time stamp and the first device time stamp.

In some examples, detecting the input by the mobile device triggers the mobile device to process a task associated with the input and generate a second return signal. Furthermore, the second return signal is sent to the autonomy unit controller and the autonomy unit controller generates a third diagnostic signal time stamp upon receiving the second return signal. The autonomy unit controller determines a second time period between the second diagnostic signal time stamp and the third diagnostic signal time stamp.

BRIEF DESCRIPTION OF THE DRAWING

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 4A depicts signals sent to monitor communication and processing of the vehicle of FIG. 1.

FIG. 4B depicts a comparison of a time period and a threshold to monitor communication and processing of the vehicle of FIG. 1.

FIG. 5 is a block diagram of a display of the mobile device of FIG. 2

DETAILED DESCRIPTION OF EXAMPLE EMBODIMENTS

Figure 1:
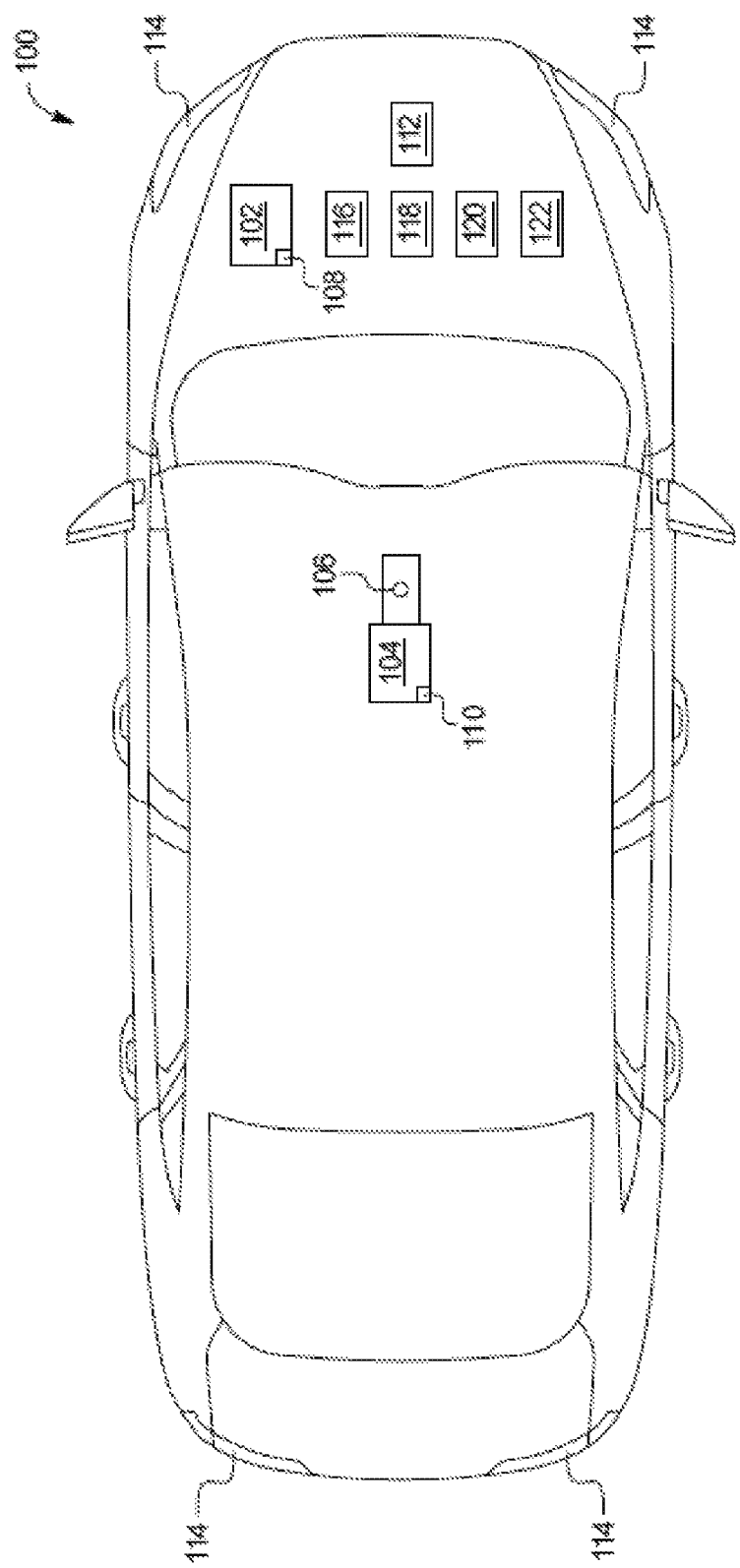
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include motive functions that are at least partially autonomously controlled by the vehicle. For example, some vehicles include cruise control in which the vehicle controls acceleration and/or deceleration of the vehicle so that a speed of the vehicle is maintained. Further, some vehicles include adaptive cruise control in which the vehicle controls acceleration and/or deceleration of the vehicle so that a speed of the vehicle and a following distance behind a lead vehicle are maintained.

Additionally, some vehicles include park-assist systems, such as remote park-assist systems, in which the vehicle autonomously controls motive functions of the vehicle to park the vehicle into a parking spot. Remote park-assist systems are configured to autonomously park a vehicle when a driver has already exited the vehicle. Some remote park-assist systems require the driver to provide a continuous input via a mobile device in wireless communication with the vehicle to instruct the vehicle to autonomously park in the parking spot. In some instances, there may be latency in communication between the mobile device and the vehicle that causes the vehicle to continue to receive an input from the mobile device when the operator is no longer providing an input to the mobile device. In such instances, the vehicle may potentially continue to perform remote park-assist functions when the operator no longer desires to perform such functions.

Example apparatus and methods disclosed herein diagnose and mitigate latency and/or other communication errors between a vehicle and a mobile device that is configured to initiate remote motive control features of the vehicle. Examples disclosed herein include a vehicle that wirelessly transmits diagnostic signals and other system control signals to a mobile device at predetermined time intervals. In some examples, the vehicle system utilizes timers and diagnostics to monitor for delay in communication between the vehicle and the mobile device. In some examples, the vehicle system timers and diagnostics determine whether the communication delay is caused by the mobile device streaming other data, the mobile device being overburdened with additional background processing and/or a communication module of the vehicle being overburdened. In some examples, the vehicle system sends a notification to communicate one or more potential causes of the delay to the user of vehicle system. The system will allow the user to correct the communication delay if the delay is detected while the vehicle system is in a pre-maneuver state. Alternatively, the system will stop performance of the maneuver if the delay is detected while a remote motive control maneuver is being performed.

As used herein, "remote motive control," and "vehicle remote motive control" refer to controlling motive functions of the vehicle without direct steering or velocity input (i.e., direct input on steering wheel and/or accelerator) from an operator to autonomously control movement of the vehicle. In one non-limiting example, a remote park assist-system of an autonomy unit controls the motive functions of the vehicle upon initiation from a driver to remotely park the vehicle into a parking spot. In some embodiments, the user provides an input on a mobile device (e.g., a smart phone, a tablet computer, a smart watch, a fob, any other such mobile device and/or combinations therein) that is received by the autonomy unit. The autonomy unit controls the motive functions of the vehicle (e.g., steering, velocity increase, velocity decrease) based on the user provided input to the mobile device.

As used herein, to "tether" refers to enabling a mobile device to cause a vehicle to perform remote parking or other remote motive control maneuver. In one non-limiting example, a vehicle is configured to perform remote parking upon receiving instruction(s) to do so from a mobile device when the mobile device is tethered to the vehicle and is configured to not perform remote parking when the mobile device is untethered from the vehicle. As used herein, a "tethered" device refers to a mobile device that is enabled to send instructions to a vehicle to perform remote parking. For example, a mobile device is tethered to a vehicle responsive to the mobile device being wirelessly communicatively coupled to the vehicle and located within a predetermined tethering range (e.g., 6 meters) of the vehicle. In such examples, a mobile device that sends instructions to a vehicle to perform remote parking is untethered from the vehicle if the mobile device is beyond the tethering range of the vehicle. In some examples, a mobile device of an operator is tethered via communication between the vehicle and another device (e.g., a key fob) carried by the operator. In such examples, the vehicle may detect that the key fob is within a predetermined tethering range of the vehicle, presume that the operator is carrying both the key fob and the mobile device associated with the operator, and subsequently tether the mobile device to the vehicle. Further, in cases where the key fob shares wireless technology with the mobile device (e.g., BLE, UWB or other such communication protocol) the mobile device may confirm the key fob is within a specified distance of the phone (e.g., 1 meter) via received signal strength indicator(s) (RSSI), Time-of-Flight or other such methods of validating the assumption that the operator controlling the mobile device is also in possession of the key fob.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes an engine 102, a transmission 104, and a transmission gear selector 106.

For example, the engine 102 includes an internal combustion engine, an electric motor, a fuel-cell engine, and/or any other type of engine or motor that is configured to propel the vehicle 100. For example, an internal combustion engine generates mechanical power to propel the vehicle 100 by combusting fuel (e.g., gasoline, petrol, etc.), and an electric motor generates mechanical power to propel the vehicle 100 by converting electrical energy stored in a battery (e.g., of a battery cell and/or a battery pack) into mechanical energy.

The transmission 104 controls an amount of power generated by the engine 102 that is transferred to other components of the vehicle 100, such as a powertrain, wheels, etc. For example, the transmission 104 includes a gearbox that controls the amount of power transferred to the components of the vehicle 100. The transmission gear selector 106 enables an operator (e.g., a driver) of the vehicle 100 to control a setting of the transmission 104 that affects how the engine 102 propels the vehicle 100. For example, the transmission gear selector 106 enables the operator to position the transmission 104 in park, neutral, reverse, drive, first gear, etc.

Further, the vehicle 100 of the illustrated example includes an engine sensor 108 and a transmission position sensor 110. The engine sensor 108 detects whether the engine 102 is activated or deactivated. The transmission position sensor 110 detects a current position (e.g., park, neutral, reverse, drive, first gear, etc.) of the transmission 104 and/or the transmission gear selector 106. In some embodiments, the vehicle 100 does not include a gear box. Accordingly, in these embodiments, the transmission position sensor 110 is not required to detect the current position of the transmission 104 and/or the transmission gear selector 106.

As illustrated in FIG. 1, the vehicle 100 also includes a vehicle speed sensor 112, external lamps 114, and a horn 116. For example, the vehicle speed sensor 112 detects a speed at which the vehicle 100 is travelling. In some examples, the vehicle speed sensor 112 detects an acceleration or deceleration of the vehicle 100 by monitoring the speed at which the vehicle 100 is traveling over a period of time. Further, the external lamps 114 emit light to facilitate operation of the vehicle 100 in low-light environments and/or to alert nearby vehicle(s), driver(s), pedestrian(s), and/or other people of functions being performed by the vehicle 100. For example, the external lamps 114 include headlamps, such as high-beam headlamps and low-beam headlamps, to illuminate an area in front of the vehicle 100 in low-light environments. Additionally or alternatively, the external lamps 114 include brake lamps to alert others that the vehicle 100 is about to turn and/or turn-signal lamps to alert others that the vehicle 100 is braking. Additionally, the horn 116 emits a loud audio signal. For example, an operator (e.g., a driver) of the vehicle 100 activates the horn 116 (e.g., by pressing a button located within a driving wheel of the vehicle 100) to alert pedestrians, vehicle operators, and/or other people of a presence of the vehicle 100 and/or of a nearby hazard.

Figure 2:
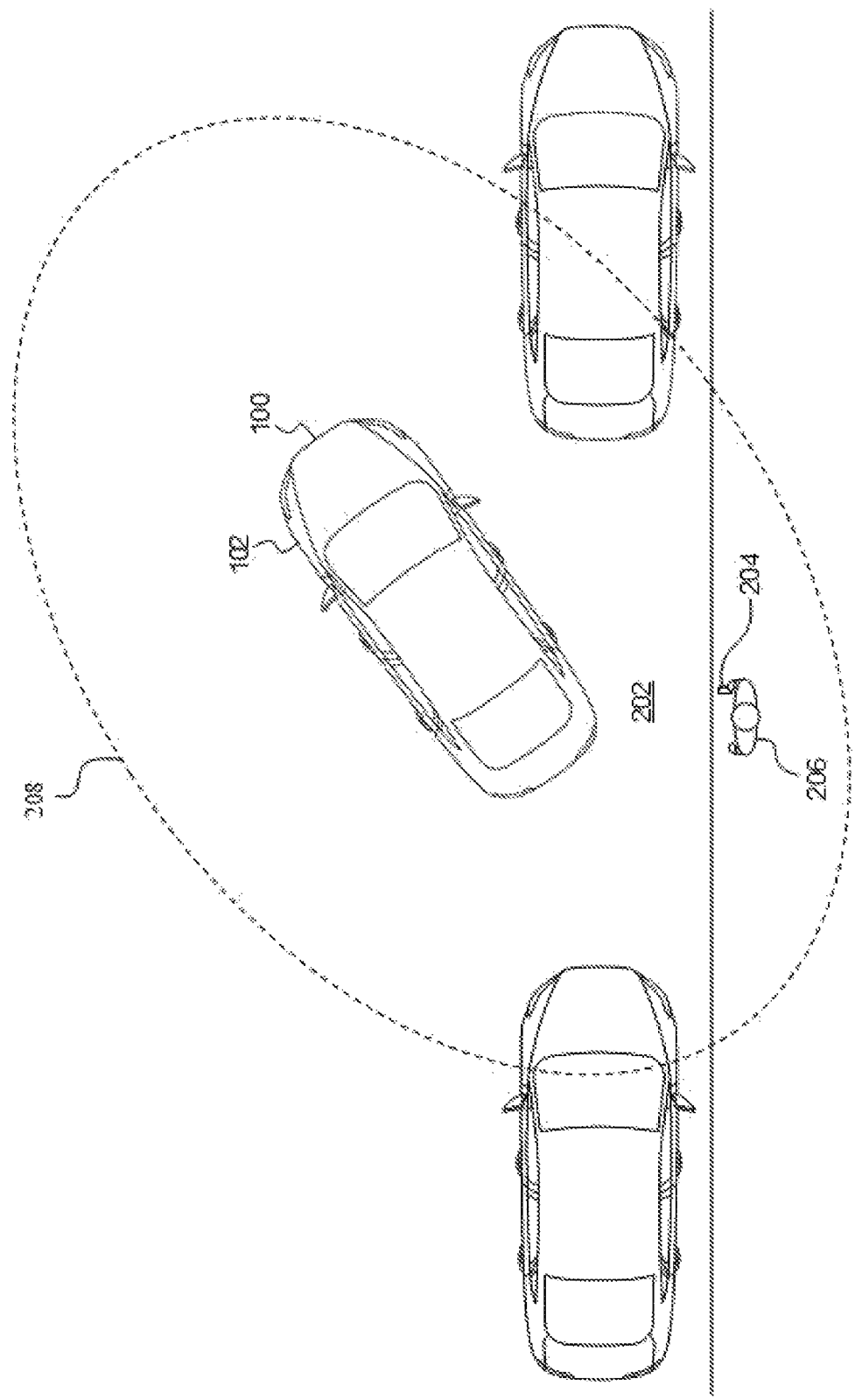
FIG. 2 illustrates an example mobile device initiating remote parking of the vehicle of FIG. 1.

The vehicle 100 of the illustrated example also includes a communication module 118 that is configured to communicatively connect to a mobile device of a user of the vehicle 100 (e.g., a mobile device 204 of a user 206 of FIG. 2). The communication module 118 includes hardware and firmware to establish a wireless connection with the mobile device. For example, the communication module 118 is a wireless personal area network (WPAN) module that wirelessly communicates with mobile device(s) of user(s) via short-range wireless communication protocol(s). In some examples, the communication module 118 implements the Classic Bluetooth®, Bluetooth® and/or Bluetooth® Low Energy (BLE) protocols. The Classic Bluetooth®, Bluetooth® and BLE protocols are set forth in Volume 6 of the Bluetooth® Specification 4.0 (and subsequent revisions) maintained by the Bluetooth® Special Interest Group. Additionally, or alternatively, the communication module 118 is configured to wirelessly communicate via Wi-Fi®, Wi-Fi® low power, Near Field Communication (NFC), Ultra-Wide Band (UWB), and/or any other short-range and/or local wireless communication protocol (e.g., IEEE 802.11 a/b/g/n/ac) that enables the communication module 118 to communicatively couple to a mobile device. In some examples, the communication module 118 wirelessly communicates via Wi-Fi® and/or Wi-Fi® low power protocols (e.g., Wi-Fi HaLow™ operating at 900 MHz) to facilitate communication with a mobile device when a line-of-sight between the communication module 118 and the mobile device is interrupted. Further, in some examples, the vehicle utilizes a Li-Fi protocol (e.g., a light-based LAN communication protocol) and/or a mid-frequency UHF protocol (e.g., at 433 MHz or 902 MHz) to communicate with the mobile device.

As illustrated in FIG. 1, the vehicle 100 includes an autonomy unit 120. The autonomy unit 120 is an electronic control unit (ECU) (e.g., one of a plurality of electronic control units 606 of FIG. 6) of the vehicle 100 that performs autonomous and/or semi-autonomous functions of the vehicle 100. For example, the autonomy unit 120 autonomously controls motive functions of the vehicle 100 to perform remote parking of the vehicle 100 into an available parking spot (e.g., a parking spot 202 of the FIG. 2) and/or to otherwise autonomously and/or semi-autonomously drive the vehicle 100. For example, the autonomy unit 120 controls motive functions of the vehicle 100 based on data collected from sensor(s) (e.g., radar sensor(s), LIDAR sensor(s), ultrasonic sensor(s), etc.) of the vehicle 100 and/or camera(s) of the vehicle 100.

The vehicle 100 of the illustrated example also includes an autonomy unit controller 122 that monitors for latency in communication between the vehicle 100 and a mobile device (e.g., the mobile device 204) that is utilized by a user (e.g., the user 206) to initiate remote parking. For example, the autonomy unit controller 122 of the illustrated examples initiates one or more timers and sends a series of pings to the mobile device via the communication module 118 to monitor for latency in communication with mobile device over a period of time while the autonomy unit 120 performs remote parking. Each of the pings sent by the communication module 118 includes a counter signal that facilitates identification of latency in communication between the mobile device and the vehicle 100.

In another such example, the autonomy unit controller 122 sends a diagnostic signal to the mobile device via the communication module 118. Further, the autonomy unit controller 122 is configured to receive a corresponding return signal that includes a time stamp from the mobile device via the communication module 118. The mobile device generates the time stamp based on receiving an initial input, from a user of the mobile device, in response to receipt of the diagnostic signal. To determine whether there is an acceptable or an unacceptable amount of latency in communication between the mobile device and the vehicle 100, the autonomy unit controller 122 determines a time period between the sending of the diagnostic signal and the generation of the time stamp generated by the mobile device in response to receipt of the diagnostic signal. For example, an acceptable amount of latency is less than a predetermined threshold amount of latency, and an unacceptable amount of latency is greater than or equal to the predetermined threshold amount of latency. Further, the autonomy unit controller 122 compares the time period to a predetermined threshold (e.g., a latency threshold). The autonomy unit controller 122 detects that there is unacceptable latency in communication between the mobile device and the vehicle 100 if the time period is greater than the predetermined threshold, and the autonomy unit controller 122 detects that there is acceptable latency if the time period is less than or equal to the predetermined threshold. In response to detecting unacceptable latency, the autonomy unit controller 122 sends a notification via the communication module 118 to the mobile device identifying the communication latency between the vehicle 100 and the mobile device. In some examples, the notification includes a plurality of potential causes for the detected latency between the vehicle 100 and the mobile device to help the user correct the issue.

In another such example, the autonomy unit controller 122 includes a time information or other unique identifier (e.g., time stamp) with the diagnostic signal sent to the mobile device via the communication module 118. Alternatively, the autonomy unit controller 122 sends the time information to the mobile device, via the communication module 118, independent from the diagnostic signal. The mobile device incorporates the time information into the corresponding return signal sent from the mobile device, via the communication module 118, to the autonomy unit controller 122. In another such example, the mobile device incorporates the time information associated with the diagnostic signal sent from autonomy unit controller 122 with a time information (e.g., time stamp) generated by the mobile device. As such, the mobile device incorporates the time information associated with the diagnostic signal and the time information generated by the mobile device into the corresponding return signal sent from the mobile device, via the communication module 118, to the autonomy unit controller 122.

For example, if the detected latency is during a pre-maneuver portion of the remote motive control, the autonomy unit controller 122 pauses the vehicle and prevents the autonomy unit 120 from allowing or otherwise enabling the vehicle 100 to move during the remote motive control maneuver. In some examples, the user is provided a predetermined amount of time to investigate and/or correct the potential causes for the latency. If the user is successful, the autonomy unit controller 122 enables remote motive control of the vehicle 100 and allows the user and the autonomy unit controller 122 to proceed with executing the maneuver during the remote motive control of the vehicle 100. If the user is not successful, the autonomy unit controller 122 and/or the autonomy unit 120 aborts the remote motive control. Additionally, or alternatively, if the detected latency is during a maneuver, the autonomy unit controller 122 instructs the autonomy unit 120 to bring the vehicle 100 to a halt and sends an audio alert emitted via the horn 116 (e.g., traffic horn, electronic chirper, external speaker, and other such acoustic sound devices) and/or a visual alert emitted via one or more of the external lamps 114. The autonomy unit controller 122 further sends a notification to the mobile device to also emit an alert (e.g., an audio alert such as a chirp, a visual alert presented via a display, a haptic alert such as a vibration). The notification also includes the plurality of potential causes for the detected latency between the vehicle 100 and the mobile device to help the user correct the issue. In some examples, the user is provided a predetermined amount of time to investigate and/or correct the potential causes for the latency. If the user is successful, the autonomy unit controller 122 instructs the autonomy unit 120 to resume the remote motive control, otherwise the autonomy unit controller 122 and/or the autonomy unit 120 aborts the remote motive control. Further, in response to detecting that there is acceptable latency, the autonomy unit controller 122 enables the autonomy unit 120 to cause the vehicle 100 to move during remote parking.

In some examples, the autonomy unit controller 122 sends one or more signals via the communication module 118 in response to determining that remote parking is active. The communication module 118 does not send signals to the mobile device when remote parking is inactive, for example, to reduce an amount of communication signals being sent between the vehicle 100 and the mobile device. The autonomy unit controller 122 of the illustrated example detects remote motive control of the vehicle is active in response to the communication module 118 determining that the mobile device is within a tethering range for remote motive control (e.g., a tethering range 208 of FIG. 2), the communication module 118 receiving a remote motive control instruction from the mobile device, the engine sensor 108 detecting that the engine 102 is active, and/or the transmission position sensor 110 detecting that the transmission 104 is not in park. While FIG. 1 shows the autonomy unit 120 and the autonomy unit controller 122 as separate components, it will be understood that the autonomy unit controller 122 may be incorporated into the autonomy unit 120.

FIG. 2 illustrates one non-limiting example of remote motive control where the vehicle 100 is remotely parked into a parking spot 202 via a mobile device 204 (e.g., a smart phone, a tablet computer, a smart watch, a fob, any other such mobile device and/or combinations therein) of a user 206 (e.g., an operator of the vehicle 100). In the illustrated example, the parking spot 202 is a parallel parking spot. In other examples, the parking spot 202 for which the user 206 utilizes remote park-assist is a perpendicular parking spot or a diagonal parking spot.

As illustrated in FIG. 2, an exemplary remote motive control (e.g., remote park-assist) of the autonomy unit 120 of the vehicle 100 performs remote parking when the user 206 is located outside of a cabin of the vehicle 100. The user 206 utilizes the mobile device 204 to send an instruction to the vehicle 100 to perform remote parking. For example, the user 206 provides an input to cause a communication module of the mobile device 204 to wirelessly send an instruction to the communication module 118 of the vehicle 100. The autonomy unit controller 122 receives the instruction to perform remote parking from the mobile device 204 via the communication module 118.

Further, the autonomy unit controller 122 determines whether the autonomy unit 120 is to perform remote parking upon receiving the instruction to do so based upon, at least in part, whether the mobile device 204 is tethered to the vehicle 100. For example, the mobile device 204 is tethered to the vehicle 100 responsive to the mobile device 204 being (i) wirelessly communicatively coupled to the communication module 118 of the vehicle 100 and (ii) located within a tethering range 208 of the vehicle 100. That is, the autonomy unit 120 is configured to perform remote parking of the vehicle 100 responsive to the autonomy unit controller 122 determining that the mobile device 204 is within the tethering range 208 while sending the remote parking instruction to the vehicle 100. Further, the autonomy unit 120 is configured to not perform remote parking of the vehicle 100 responsive to the autonomy unit controller 122 determining that the mobile device 204 is beyond the tethering range 208 while sending the remote parking instruction to the vehicle 100. That is, if the mobile device 204 moves from within to beyond the tethering range 208, the autonomy unit 120 (temporarily) disables performance of remote parking. To reactivate remote parking, the user 206 is to move the mobile device 204 back into the tethering range and resend a remote parking instruction to the vehicle 100 while within the tethering range 208.

In the illustrated example, the tethering range 208 is defined based upon a predetermined distance (e.g., 6 meters) from an exterior surface of the vehicle 100. That is, the mobile device 204 is within the tethering range 208 of the vehicle 100 if a distance between the mobile device 204 and the exterior surface of the vehicle 100 is less than or equal to the predetermined distance. In some examples, the autonomy unit controller 122 determines the distance between the mobile device 204 and the exterior surface of the vehicle 100 based upon received signal strength indicator(s) (RSSI) of signal(s) that are communicated between the mobile device 204 and the communication module 118. For example, the autonomy unit controller 122 determines the distance between the mobile device 204 and the vehicle 100 based upon the RSSI(s) of the instruction(s) sent to the vehicle 100 by the mobile device 204 to perform remote parking. In some examples, the autonomy unit controller 122 determines the distance between the mobile device 204 and the vehicle 100 via GPS locations of the mobile device 204 and the vehicle 100. Additionally, or alternatively, the autonomy unit controller 122 may utilize any other manner (e.g., time-of-flight, angle-of-arrival, etc.) for determining the distance between the mobile device 204 and the vehicle 100 during remote parking.

Figure 3A:
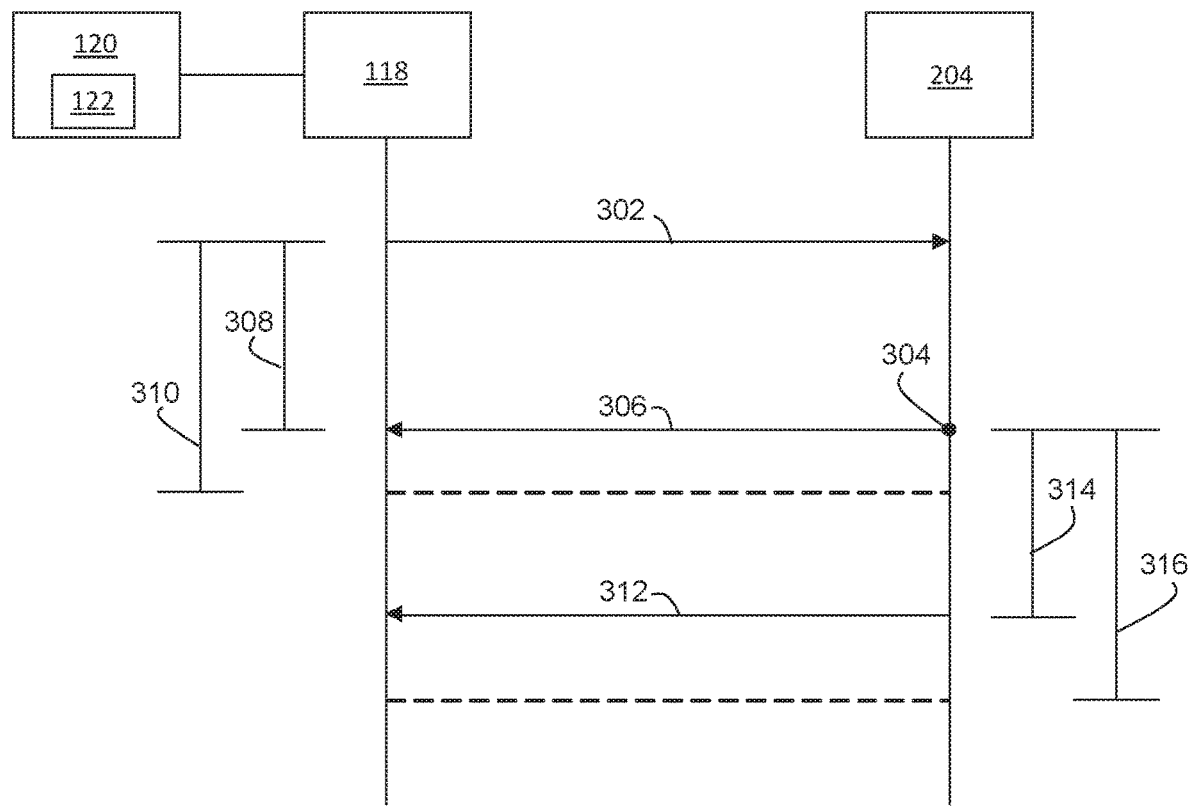
FIG. 3A depicts signals sent to monitor communication and processing between the vehicle of FIG. 1 and the mobile device of FIG. 2.

FIG. 3A, depicts signals sent to monitor the latency in communication and processing between the vehicle 100 and the mobile device 204. As illustrated in FIG. 3A, the communication module 118 of the vehicle sends a diagnostic signal 302 to the mobile device 204. In one example, a user (e.g., user 206 of FIG. 2) initiates a remote motive control session by activating a remote motive control application on the mobile device 204. Upon receiving the remote motive control request, the autonomy unit controller 122 prepares the autonomy unit 120 to perform remote parking by sending the diagnostic signal 302, via the communication module 118, to the mobile device 204 to monitor communication during the current remote motive control session. For example, when the user activates the remote motive control application on the mobile device 204, the mobile device 204 displays an interface of the remote motive control application, such as an unlock screen or other such interface. As such, the communication module 118 sends the diagnostic signal 302 to correspond with presentation of the unlock screen by the mobile device 204 such that latency between the communication module 118 and the mobile device 204 can be determined before starting a maneuver of the remote motive control session (e.g., remote parking). While it is disclosed that the diagnostic signal 302 corresponds to the presentation of the unlock screen of the remote motive control application, it will be understood that the diagnostic signal 302 may correspond with other portions of the remote motive control application, such as but not limited to, presentation of the input screen during performance of a remote motive control maneuver and other such portions of the remote motive control application.

In the illustrated example, the communication module 118 sends the diagnostic signal 302 from the autonomy unit controller 122 to the mobile device 204. In response to the mobile device 204 receiving the diagnostic signal 302 and detecting an input 304 in response to the diagnostic signal 302 (e.g., input to interface presented on display 502 of the mobile device 204), the mobile device 204 generates and sends a first return signal 306 (e.g., input on mobile device in response to diagnostic signal) to the autonomy unit controller 122 via the communication module 118 of the vehicle 100. That is, the communication module 118 sends the diagnostic signal 302 to the mobile device 204, and detection of the input 304 on the mobile device 204 triggers the mobile device 204 to send the return signal 306 to the autonomy unit controller 122 via the communication module 118.

Subsequently, the autonomy unit controller 122 determines a time period 308 (e.g., a first time period) between the sending of the diagnostic signal 302 and the receipt of the return signal 306. In some examples, the diagnostic signal 302 includes a unique identifier generated by the autonomy unit controller 122 (i.e., a number, a letter, a unique character, any other unique identifier or combination thereof) and the return signal 306 includes the unique identifier associated with the received diagnostic signal 302. As a result, the autonomy unit controller 122 determines when the communication module 118 sends the diagnostic signal 302 including the unique identifier and receives the corresponding return signal 306 including the unique identifier associated with the diagnostic signal 302.

In some examples, the autonomy unit controller 122 generates a first time stamp (i.e., first diagnostic signal time stamp) upon sending the diagnostic signal 302 including the unique identifier, via the communication module 118, to the mobile device 204. Furthermore, the autonomy unit controller 122 generates a second time stamp (i.e., second diagnostic signal time stamp) upon receiving the return signal including the unique identifier, via the communication module 118, from the mobile device 204. The autonomy unit controller 122 determines the time period 308 between the first time stamp and the second time stamp.

In some examples, during a continuous communication session the autonomy unit controller 122 sends a plurality of diagnostic signals 302 (i.e., first diagnostic signal, second diagnostic signal, third diagnostic signal, etc.) to the mobile device 204. The autonomy unit controller 122 receives a plurality of return signals 306 (i.e., first return signal, second return signal, third return signal, etc.) from the mobile device 204. Each of the plurality of diagnostic signals 302 are sent in consecutive order and include a different unique identifier (i.e., sequential numbers, sequential letters, different unique characters, any other such unique identifiers or combinations thereof). Each of the plurality of return signals 306 include the unique identifier that corresponds to a specific diagnostic signal 302 (i.e., a first unique identifier corresponds with a first diagnostic signal and corresponding first return signal). In other words, the autonomy unit controller 122 uses the unique identifier to confirm the receipt of the return signal 306 corresponds with a specific diagnostic signal 302 (i.e., the first return signal corresponds with the first diagnostic signal, the second return signal corresponds with the second diagnostic signal, the third return signal corresponds with the third diagnostic signal etc.). Additionally, or alternatively, the diagnostic signal 302 and the return signal 306 each include a respective time stamp to enable the autonomy unit controller 122 to determine when the diagnostic signal 302 was sent and the return signal 306 was received. In some examples the time stamps are relative to the start or initiation of the active remote motive control session.

In some examples, the diagnostic signal 302 includes the first time stamp (i.e., first diagnostic signal time stamp) generated by the autonomy unit controller 122 and the return signal 306 includes the first time stamp associated with the received diagnostic signal 302. Furthermore, the autonomy unit controller 122 generates the second time stamp (i.e., second diagnostic signal time stamp) upon receiving the return signal 306 including the first time stamp, via the communication module 118, from the mobile device 204. The autonomy unit controller 122 determines the time period 308 between the first time stamp and the second time stamp. In such examples, the first time stamp (i.e., first diagnostic signal time stamp) is included in the diagnostic signal 302 without the unique identifier. Alternatively, the first time stamp and the unique identifier may be included in the diagnostic signal 302.

In some examples, a device controller or other such component of the mobile device 204 generates a first time stamp (i.e., first device time stamp) upon detecting the input 304 in response to the diagnostic signal 302 and includes the first device time stamp in the return signal 306. In some examples, the autonomy unit controller 122 determines the time period 308 between the first diagnostic signal time stamp and the first device time stamp. In some examples, a time generated by the autonomy unit controller 122 is synchronized with a time generated by the device controller of the mobile device 204. In some examples the time stamps are relative to the start or initiation of the active remote motive control session.

Figure 3B:
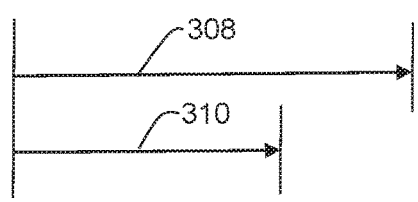
FIG. 3B depicts a comparison of a time period and a threshold to monitor communication and processing between the vehicle of FIG. 1 and the mobile device of FIG. 2.

The autonomy unit controller 122 also compares the time period 308 to a threshold 310 (e.g., a communication latency threshold). In some examples, the threshold 310 corresponds to a predefined time limit that is associated with latency in communication between the mobile device 204 and the communication module 118. A predetermined value for the threshold 310 is stored in a memory (i.e., memory 612 of FIG. 6) of the autonomy unit controller 122. For example, as illustrated in FIG. 3B, in response to determining that time period 308 is greater than the threshold 310, the autonomy unit controller 122 pauses, disables, and/or prevents the autonomy unit 120 from moving the vehicle 100 during the active remote motive control session. Additionally, in some examples the autonomy unit controller 122 sends a notification (e.g., notification 504 of FIG. 5) to the user of the mobile device 204. For example, the notification includes a suggestion that the mobile device 204 is communicating (e.g., streaming over BLE or other communication protocol) for non-remote motive control purposes. In some examples, the notification includes a list of potential sources of non-remote motive control communications, such as but not limited to, streaming video data, streaming audio data, and the like. The notification further includes an acknowledgement input (e.g., acknowledgment input 506 of FIG. 5) to confirm that the user received the notification and has taken corrective action to address the detected time period 308 being greater than the threshold 310. Otherwise, in response to detecting that the time period 308 is less than or equal to the threshold 310, the autonomy unit controller 122 enables the autonomy unit 120 to cause the vehicle 100 to move during remote parking.

In some examples, the autonomy unit 120 and/or the autonomy unit controller 122 are configured to monitor the processing latency of the mobile device 204 during the active remote motive control session. For example, in response to the mobile device 204 detecting the input 304, the mobile device 204 begins processing a task of the remote motive control application associated with the input 304, such as but not limited to, performing the unlock procedure to initiate the current remote motive control session, performing a remote motive control maneuver, and other such task. The mobile device 204 generates a second return signal 312 (e.g., task output signal) when the mobile device 204 finishes processing the current task and is ready to transmit an output signal or other such message back to the autonomy unit controller 122. That is, responsive to receiving the input 304, the mobile device 204 begins processing an instruction or task of the remote motive control application. For the given communication cycle between the mobile device 204 and the vehicle 100, the mobile device 204 generates the second return signal 312 upon completion of processing the instruction or task and sends the second return signal 312 to the autonomy unit controller 122 via the communication module 118.

In some examples, the autonomy unit controller 122 generates a third time stamp (i.e., third diagnostic signal time stamp) upon receiving the second return signal 312. The autonomy unit controller determines a time period 314 (e.g., a second time period) between the second time stamp and the third time stamp (e.g., completion of processing the task associated with the input 304). In other words, the autonomy unit controller 122 determines the time period 314 between receiving the return signal 306 and receiving the second return signal 312. In some examples, the second return signal 312 includes a time stamp, generated by the mobile device 204, associated with the detection of the input 304 and a time stamp associated with the generation of the second return signal 312 to enable the autonomy unit controller 122 to determine a processing time (i.e., time period 314) of the task associated with the input 304. In some examples the time stamps are relative to the start or initiation of the active remote motive control session. In some examples, the second return signal 312 includes the unique identifier associated with the received diagnostic signal 302. In some examples, the second return signal 312 includes the first time stamp (i.e., first diagnostic signal time stamp) associated with the sending of the diagnostic signal 302 to the mobile device.

Figure 3C:
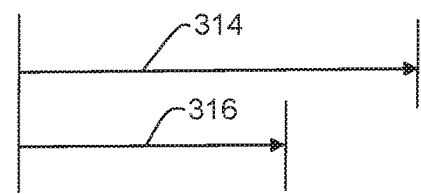
FIG. 3C depicts a comparison of a time period and a threshold to monitor communication and processing between the vehicle of FIG. 1 and the mobile device of FIG. 2.

The autonomy unit controller 122 also compares the time period 314 to a threshold 316 (e.g., a mobile device processing threshold or second threshold). For example, the threshold 316 corresponds to a predefined time limit that is associated with latency in processing of an instruction or task by the mobile device 204. A predetermined value for the threshold 316 is stored in a memory (i.e., memory 612 of FIG. 6) of the autonomy unit controller 122. In one such example as illustrated in FIG. 3C, in response to determining the time period 314 is greater than the threshold 316, the autonomy unit controller 122 pauses, disables and/or prevents the autonomy unit 120 from moving the vehicle 100 during the active remote motive control session. Additionally, in some examples the autonomy unit controller 122 sends a notification (e.g., notification 504 of FIG. 5) to the user of the mobile device 204. For example, the notification includes a suggestion that the mobile device 204 is overburdened and not able to process instructions within the threshold 316. In some examples, a determination of the type of burden includes a comparison of a total communication time with a processing time on the mobile device 204 and the vehicle 100. In one such example, a short local processing time by the mobile device 204 and a long communication period between the mobile device 204 and the vehicle 100 would imply a communication latency or other such communication issue. In another such example, a long local processing time on the mobile device 204 and a short communication period between the mobile device 204 and the vehicle 100 would imply a processing burden on the mobile device 204. In some examples, the notification includes a list of potential sources of mobile device 204 processing overburden, such as but not limited to, number of background applications running on the mobile device 204, a list of non-remote motive control applications running in the background of the mobile device 204, and other such sources. The notification further includes an acknowledgement input (e.g., acknowledgment input 506 of FIG. 5) to confirm that the user received the notification and has taken corrective action to address the detected time period 314 being greater than the threshold 316. Otherwise, in response to detecting that the time period 314 is less than or equal to the threshold 316, the autonomy unit controller 122 enables the autonomy unit 120 to cause the vehicle 100 to move during remote parking. While FIG. 3 shows the autonomy unit controller 122 incorporated with the autonomy unit 120, it will be understood that the autonomy unit 120 and the autonomy unit controller 122 may be separate components that are communicably coupled to one another within the vehicle 100.

FIG. 4A illustrates timestamps sent to the autonomy unit controller 122 to monitor the latency in processing of the autonomy unit 120 during a remote motive control session. The autonomy unit 120 of the vehicle sends a first timestamp 402 that corresponds with the start of a task performed by the autonomy unit 120 (e.g., autonomy unit task and/or instruction output signal). In some examples, the timestamp 402 marks or otherwise represents the start of each iteration of the remote motive control application (e.g., each iteration of the state machine while loop). Additionally, the autonomy unit 120 sends a second timestamp 404 that corresponds with the completion of the task performed by the autonomy unit 120 (e.g., autonomy unit task and/or instruction output signal). In some examples, the timestamp 404 marks or otherwise represents the end of the current iteration and a new state value (e.g., pre-maneuver state, maneuver state, etc.) of the remote motive control application being returned. For example, the user opens the remote motive control application on the mobile device 204 to initiate the remote motive control session. Provided the communication module 118 detects the mobile device 204 within tethering range (e.g., tethering range 208 of FIG. 2), the unlock screen (e.g., unlock screen presented on display 502 of FIG. 5) is presented on the mobile device 204 as part of initiating the remote motive control session. As such, the first timestamp 402 marks the beginning of the pre-maneuver state and the second timestamp 404 marks when the pre-maneuver state is completed and the active maneuver portion (e.g., remote parking of vehicle) is ready to begin.

Subsequently, the autonomy unit controller 122 determines an autonomy unit time period 406 between the generation of the first timestamp 402 and the generation of the second timestamp 404. In some examples, the autonomy unit controller 122 detects when the autonomy unit 120 generates and/or otherwise sends the first timestamp 402 and the second timestamp 404. Additionally, or alternatively, an output signal from the autonomy unit 120 may include the respective first and second time stamps 402, 404 to enable the autonomy unit controller 122 to determine the autonomy unit time period 406 between generation of a first output signal and a second output signal or other such output of the autonomy unit. In some examples, the first and second time stamps 402, 404 are relative to the start or initiation of the active remote motive control session.

The autonomy unit controller 122 also compares the autonomy unit time period 406 to a threshold 408 (e.g., autonomy unit delay threshold). For example, the threshold 408 corresponds to a predefined time limit that is associated with latency or delay in processing performed by the autonomy unit 120. A predetermined value for the threshold 408 is stored in a memory (i.e., memory 612 of FIG. 6) of the autonomy unit controller 122. In one such example as illustrated in FIG. 4B, if during a maneuver state (i.e., the pre-maneuver state) of the active remote motive control session the autonomy unit controller 122 determines the autonomy unit time period 406 is greater than the threshold 408, the autonomy unit controller 122 sends a notification to the user of the mobile device 204 communicating that the vehicle is experiencing a processing delay. The user is then asked to stand-by while the autonomy unit 120 performs a self-check in attempt to correct the issue. The autonomy unit controller 122 will send a follow-up notification to the user of the mobile device 204 when the self-check is complete. Alternatively, during another maneuver state (i.e., performing a parking maneuver) of remote motive control, in response to determining the autonomy unit time period 406 is greater than the threshold 408, the autonomy unit controller 122 instructs the autonomy unit 120 to pause remote motive control of the vehicle. In some examples, if the delay can be resolved prior to stopping or pausing the vehicle and/or prior to reaching a threshold change in vehicle speed, then the autonomy unit 120 can resume normal operation. Alternatively, if the delay cannot be resolved and the vehicle is unable to resume processing tasks associated with the autonomy unit 120 processing delay, the autonomy unit controller 122 disables the autonomy unit 120 to prevent the vehicle 100 from moving until the delay can be resolved. The autonomy unit controller 122 sends a notification (e.g., notification 504 of FIG. 5) to notify the user the remote motive control will remain paused for a predetermined amount of time in attempt to resolve the autonomy unit 120 processing delay. The autonomy unit controller 122 will abort the current remote motive control maneuver if the delay cannot be resolved in the predetermined amount of time. Alternatively, if during the pre-maneuver state of the active remote motive control session the autonomy unit controller determines the autonomy unit time period 406 is less than or equal to the threshold 408, the autonomy unit controller 122 enables the autonomy unit 120 to move the vehicle during the active remote motive control session.

FIG. 5 is a block diagram of the display 502 of the mobile device 204. As illustrated in FIG. 5 the display 502 includes a notification 504 and acknowledgement input 506. In some examples, during use of the remote motive control application the display 502 presents a user interface to the user of the mobile device 204 that corresponds to the active remote motive control session. For example, the display 502 presents a plurality of different user interfaces during a remote motive control session such as but not limited to, an unlock screen during a pre-maneuver state, a maneuver input screen during a maneuver state, a pause screen during a pause state, and other screens associated with states of the active remote motive control session.

In some examples, in addition to presenting screens associated with the active remote motive control session, the display 502 presents the notification 504 and/or the acknowledgment input 506 to provide information to the user of the mobile device 204 related to the communication between the vehicle and the mobile device 204. In one such example, the notification 504 includes a suggestion that the mobile device 204 is communicating (e.g., streaming over BLE or other communication protocol) for non-remote motive control purposes. Determination of this notification may include verifying that the local processing time of the mobile device 204 is within allowable latency, such that the detected latency is likely caused by sharing of communication resources by the mobile device 204. The notification may further include a list of potential sources of non-remote motive control communications, such as but not limited to, streaming video data, streaming audio data, and the like. In some examples, the display 502 further presents the acknowledgement input 506 to confirm that the user received the notification 504 and has taken corrective action to address the detected communication delay between the vehicle and the mobile device 204.

In some examples, the display 502 presents the notification 504 and/or the acknowledgment input 506 to provide information to the user of the mobile device 204 related to processing of the mobile device 204. In one such example, the notification 504 includes a suggestion that the mobile device 204 is overburdened and not able to process instructions within a predefined threshold. In such examples, the notification 504 includes a list of potential sources of mobile device 204 processing overburden, such as but not limited to, the number of background applications running on the mobile device 204, a list of non-remote motive control applications running in the background of the mobile device 204, and other such sources. In some examples, the display 502 further presents the acknowledgement input 506 to confirm that the user received the notification 504 and taken corrective action to address the detected processing delay on the mobile device 204.

In some examples, the display presents the notification 504 and/or the acknowledgment input 506 to provide information to the user of the mobile device 204 related to processing of the autonomy unit (e.g., autonomy unit 120 of FIG. 1). In one such example, the notification includes a suggestion the autonomy unit is overburdened and unable to process instructions within a predefined threshold. In such examples, the notification 504 includes an instruction to stand-by while the autonomy unit 120 performs a self-check in attempt to correct the issue. The autonomy unit controller 122 will send a follow-up notification to the user of the mobile device 204 when the self-check is complete. Alternatively, if the self-check is not successful in correcting the issue, the display 502 presents the notification 504 to notify the user that the active remote motive control session will remain paused for a predetermined amount of time in attempt to resolve autonomy unit processing delay. Furthermore, the notification 504 communicates that the active remote motive control session is aborted if the autonomy unit processing delay is not resolved within the predetermined amount of time.

Figure 6:
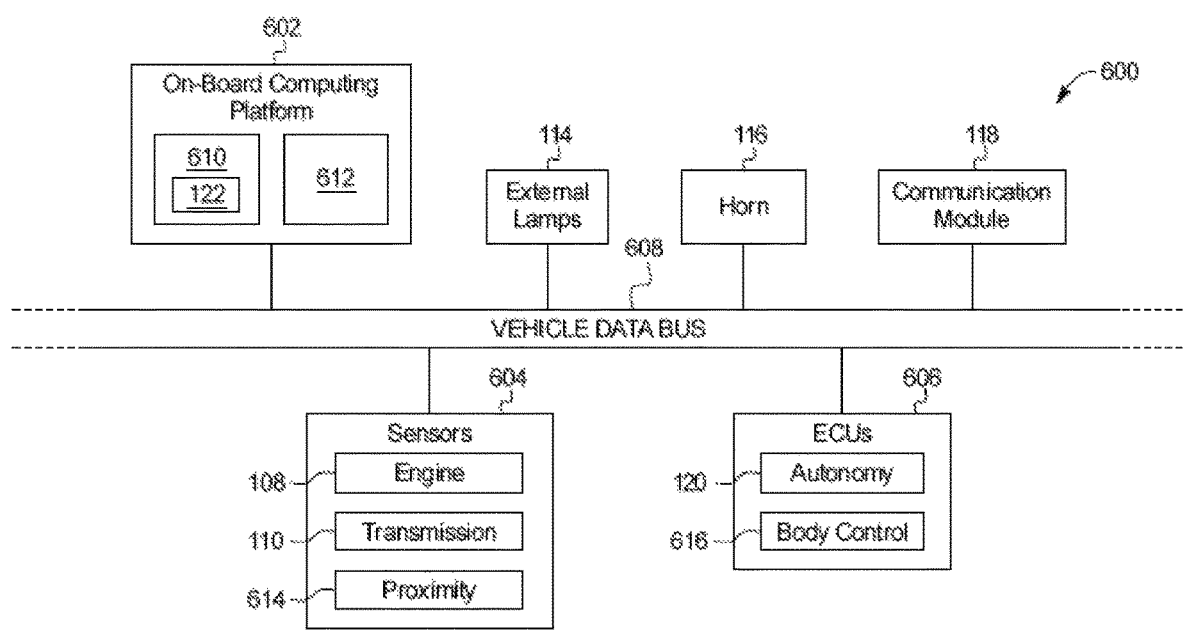
FIG. 6 is a block diagram of electronic components of the vehicle of FIG. 1.

FIG. 6 is a block diagram of electronic components 600 of the vehicle 100. As illustrated in FIG. 6, the electronic components 600 include an on-board computing platform 602, the external lamps 114, the horn 116, the communication module 118, sensors 604, electronic control units (ECUs) 606, and a vehicle data bus 608.

The on-board computing platform 602 includes a microcontroller unit, controller or processor 610 and memory 612. In some examples, the processor 610 of the on-board computing platform 602 is structured to include the autonomy unit controller 122. Alternatively, in some examples, the autonomy unit controller 122 is incorporated into another electronic control unit (ECU) with its own processor 610 and memory 612. The processor 610 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 612 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 612 includes multiple kinds of memory, particularly volatile memory and non-volatile memory.

The memory 612 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 612, the computer readable medium, and/or within the processor 610 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 604 are arranged in and around the vehicle 100 to monitor properties of the vehicle 100 and/or an environment in which the vehicle 100 is located. One or more of the sensors 604 may be mounted to measure properties around an exterior of the vehicle 100. Additionally, or alternatively, one or more of the sensors 604 may be mounted inside a cabin of the vehicle 100 or in a body of the vehicle 100 (e.g., an engine compartment, wheel wells, etc.) to measure properties in an interior of the vehicle 100. For example, the sensors 604 include accelerometers, odometers, tachometers, pitch and yaw sensors, wheel speed sensors, microphones, tire pressure sensors, biometric sensors and/or sensors of any other suitable type.

In the illustrated example, the sensors 604 include the engine sensor 108, the transmission position sensor 110, one or more proximity sensors 614, and/or any other sensor (e.g., the vehicle speed sensor 112) that monitors a property of the vehicle 100 and/or the surrounding area. For example, the engine sensor 108 detects whether the engine 102 is activated or deactivated, and the transmission position sensor 110 detects a position (e.g., park, neutral, reverse, drive, first gear, etc.) of the transmission 104 and/or the transmission gear selector 106. Further, the proximity sensors 614 monitor a surrounding area of the vehicle 100 to collect data that detects and identifies location(s) of object(s) near the vehicle 100. For example, the proximity sensors 614 collect the data to facilitate the autonomy unit 120 in performing autonomous and/or semi-autonomous driving maneuvers (e.g., remote parking) of the vehicle 100. The proximity sensors 614 include radar sensor(s), LIDAR sensor(s), ultrasonic sensor(s), and/or any other sensor(s) that detects the presence and location of nearby objects. For example, a radar sensor detects and locates an object via radio waves, a LIDAR sensor detects and locates the object via lasers, and an ultrasonic sensor detects and locates the object via ultrasound waves.

The ECUs 606 monitor and control the subsystems of the vehicle 100. For example, the ECUs 606 are discrete sets of electronics that include their own circuit(s) (e.g., integrated circuits, microprocessors, memory, storage, etc.) and firmware, sensors, actuators, and/or mounting hardware. The ECUs 606 communicate and exchange information via a vehicle data bus (e.g., the vehicle data bus 608). Additionally, the ECUs 606 may communicate properties (e.g., status of the ECUs 606, sensor readings, control state, error and diagnostic codes, etc.) to and/or receive requests from each other. For example, the vehicle 100 may have seventy or more of the ECUs 606 that are positioned in various locations around the vehicle 100 and are communicatively coupled by the vehicle data bus 608.

In the illustrated example, the ECUs 606 include the autonomy unit 120 and a body control module 616. The autonomy unit 120 controls performance of autonomous and/or semi-autonomous driving maneuvers (e.g., remote parking) of the vehicle 100 based upon, at least in part, image(s) and/or video captured by camera(s) and/or data collected by one or more of the sensors 604 of the vehicle 100. The body control module 616 controls one or more subsystems throughout the vehicle 100, such as power windows, power locks, an immobilizer system, power mirrors, etc. For example, the body control module 616 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 608 communicatively couples the external lamps 114, the horn 116, the communication module 118, the on-board computing platform 602, the sensors 604, and the ECUs 606. In some examples, the vehicle data bus 608 includes one or more data buses. The vehicle data bus 608 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 7:
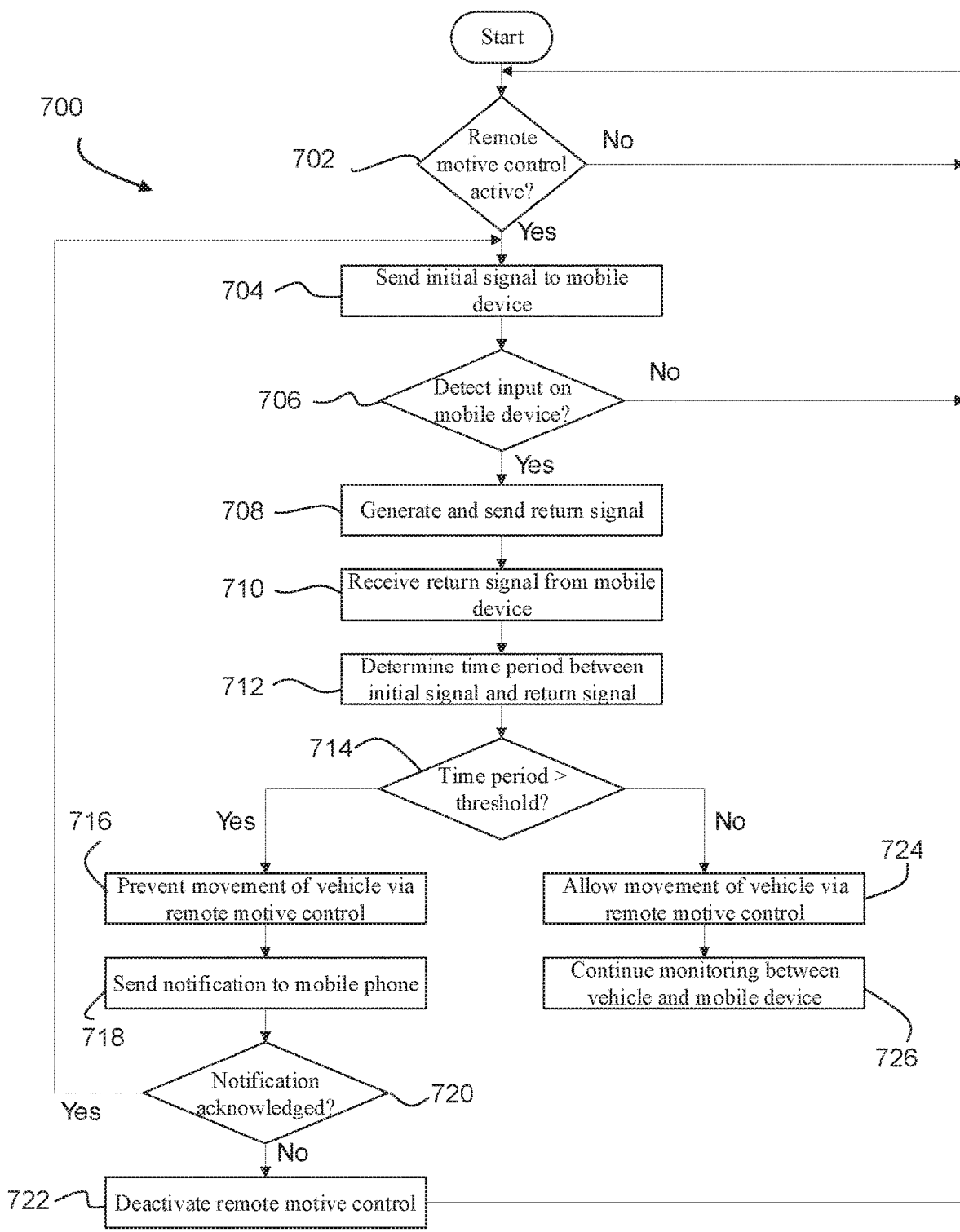
FIG. 7 is a flowchart for monitoring of communication and processing for remote motive control in accordance with the teachings herein.

FIG. 7 is a flowchart of an example method 700 to monitor communication for vehicle remote motive control. The flowchart of FIG. 7 is representative of machine readable instructions that are stored in memory (such as the memory 612 of FIG. 6) and include one or more programs which, when executed by a processor (such as the processor 610 of FIG. 6), cause the vehicle 100 to implement the example autonomy unit controller 122 of FIGS. 1 and 6. While the example program is described with reference to the flowchart illustrated in FIG. 7, many other methods of implementing the example autonomy unit controller 122 may alternatively be used. For example, the order of execution of the blocks may be rearranged, changed, eliminated, and/or combined to perform the method 700. Further, because the method 700 is disclosed in connection with the components of FIGS. 1-6, some functions of those components will not be described in detail below.

Initially, at block 702, the autonomy unit controller 122 determines whether a remote motive control session (e.g., remote parking) of the vehicle 100 is active. For example, the autonomy unit controller 122 determines that remote parking is active for the vehicle 100 in response to receiving a remote motive control instruction from the mobile device 204, determining that the mobile device 204 is within the tethering range 208 of the vehicle 100, detecting via the engine sensor 108 that the engine 102 is active, and/or detecting via the transmission position sensor 110 that the transmission 104 is not in park. In response to the autonomy unit controller 122 determining that remote parking is not activated, the method 700 remains at block 702. Otherwise, in response to the autonomy unit controller 122 determining that remote parking is activated, the method 700 proceeds to block 704.

At block 704, the autonomy unit controller 122 sends, via the communication module 118 of the vehicle 100, a diagnostic signal 302 to the mobile device 204 that is being utilized to initiate the remote motive control. For example, the user 206 opens a remote motive control application on the mobile device 204 to initiate the remote motive control session. An interface such as an unlock screen is presented on the display 502 of the mobile device 204 as part of initiating the remote motive control session. As such, the communication module 118 sends the diagnostic signal 302 to correspond with presentation of the interface on the display 502 such that latency between the communication module 118 and the mobile device 204 can be determined before a maneuver of the remote motive control session (e.g., remote parking) begins. In some examples, the diagnostic signal 302 includes a unique identifier (i.e., time information or other such unique identifier).

At block 706, the mobile device 204 determines whether an input is detected responsive to the presentation of the interface on the display 502. In response to the mobile device 204 detecting an input 304, at block 708, the mobile device 204 generates and sends a return signal 306 to the communication module 118 of the vehicle 100. In some examples, the return signal 306 includes the unique identifier included with the diagnostic signal 302. That is, upon detection of an initial input response (e.g., input 304), the mobile device 204 generates and sends the return signal 306 including the unique identifier associated with the diagnostic signal 302 to the autonomy unit controller 122. Thus, the autonomy unit controller 122 uses the unique identifier to confirm the received return signal 306 corresponds to the diagnostic signal 302. In another such example, the return signal 306 may include the unique identifier and a time stamp or other such information to the communication module 118 of the vehicle 100. Alternatively, in response to the mobile device 204 not detecting the input 304, the method 700 returns to block 702.

At block 710, the autonomy unit controller 122 receives, via the communication module 118, the return signal 306 sent by the mobile device 204. At block 712, the autonomy unit controller 122 determines a time period 308 between a sending of the diagnostic signal 302 and a receipt of the return signal 306. In some examples, the autonomy unit controller 122 detects when the communication module 118 sends the diagnostic signal 302 and receives the return signal 306 to determine the time period 308 between the sending of diagnostic signal 302 and the receipt of the return signal 306. Additionally, or alternatively, the diagnostic signal 302 and the return signal 306 include respective time stamps to enable the autonomy unit controller 122 to determine the time period 308 between the diagnostic signal 302 and the return signal 306.

At block 714, the autonomy unit controller 122 determines whether the time period 308 between the diagnostic signal 302 and the return signal 306 is greater than a latency threshold 310. In response to the autonomy unit controller 122 determining that the time period 308 is greater than the latency threshold 310, the method 700 proceeds to block 716 at which the autonomy unit controller 122 prevents the autonomy unit 120 from causing movement of the vehicle 100 during the remote motive control session. At block 718, the autonomy unit controller 122 sends a notification 504 to the mobile device 204 to indicate to the user 206 that the autonomy unit controller 122 has detected an unacceptable amount of latency in communication between the mobile device 204 and the vehicle 100. For example, the notification 504 sent to the mobile device includes a suggestion to the user 206 that the mobile device 204 is communicating (e.g., streaming over BLE) for non-remote motive control purposes. In some examples, the notification 504 includes a list of potential sources of non-remote motive control communications, such as but not limited to, streaming video data, streaming audio data, streaming GPS data, and the like. The notification 504 further includes an acknowledgement input 506 to provide confirmation to the autonomy unit controller 122 that the user received the notification 504 and has taken corrective action to address the unacceptable amount of latency in communication between the mobile device 204 and the vehicle 100.

At block 720, the autonomy unit controller 122 determines if the acknowledgment input 506 was received from the user. If the acknowledgement input was received, the method 700 returns to block 704 to determine if corrective action taken by the user (e.g., stop streaming non-remote motive control applications) was successful in addressing the detected unacceptable amount of latency in communication between the mobile device 204 and the vehicle 100. In some examples, upon return to block 704, the autonomy unit 120 waits a predetermined time (e.g., 1 to 5 seconds) to repeat the process in order to provide the user an opportunity to look for potential sources of non-remote motive control communication. In some examples, if the unacceptable amount of latency communication delay between the vehicle 100 and mobile device 204 persists after a predetermined number of attempts, the method 700 proceeds to block 722 and the current remote motive control session is aborted. Alternatively, if the acknowledgment input was not received from the user at block 720, the method 700 proceeds to block 722 and the current remote motive control session is aborted. To restart remote motive control of the vehicle 100, the user 206 subsequently is to reinitiate remote parking of the vehicle 100.

Returning to block 714, in response to the autonomy unit controller 122 determining that the time period is less than or equal to the latency threshold, the method 700 proceeds to block 724 at which the autonomy unit controller 122 enables the autonomy unit 120 to cause movement of the vehicle 100 during the remote motive control session. For example, in a remote motive control session such as remote parking, when the time period is less than or equal to the latency threshold, the autonomy unit 120 autonomously controls motive functions of the vehicle 100 to perform remote parking of the vehicle 100 into an available parking spot (e.g., a parking spot 202) and/or to otherwise autonomously and/or semi-autonomously drive the vehicle 100.

At block 726, the autonomy unit controller 122 continues to monitor the communication between the mobile device 204 and the vehicle 100 during the remote motive control session. Accordingly, the method 700 returns to block 702 to monitor communication between the mobile device 204 and the vehicle 100 and ensure there is an acceptable amount of latency between the mobile device 204 and vehicle 100 during the active remote motive control session.

Figure 8:
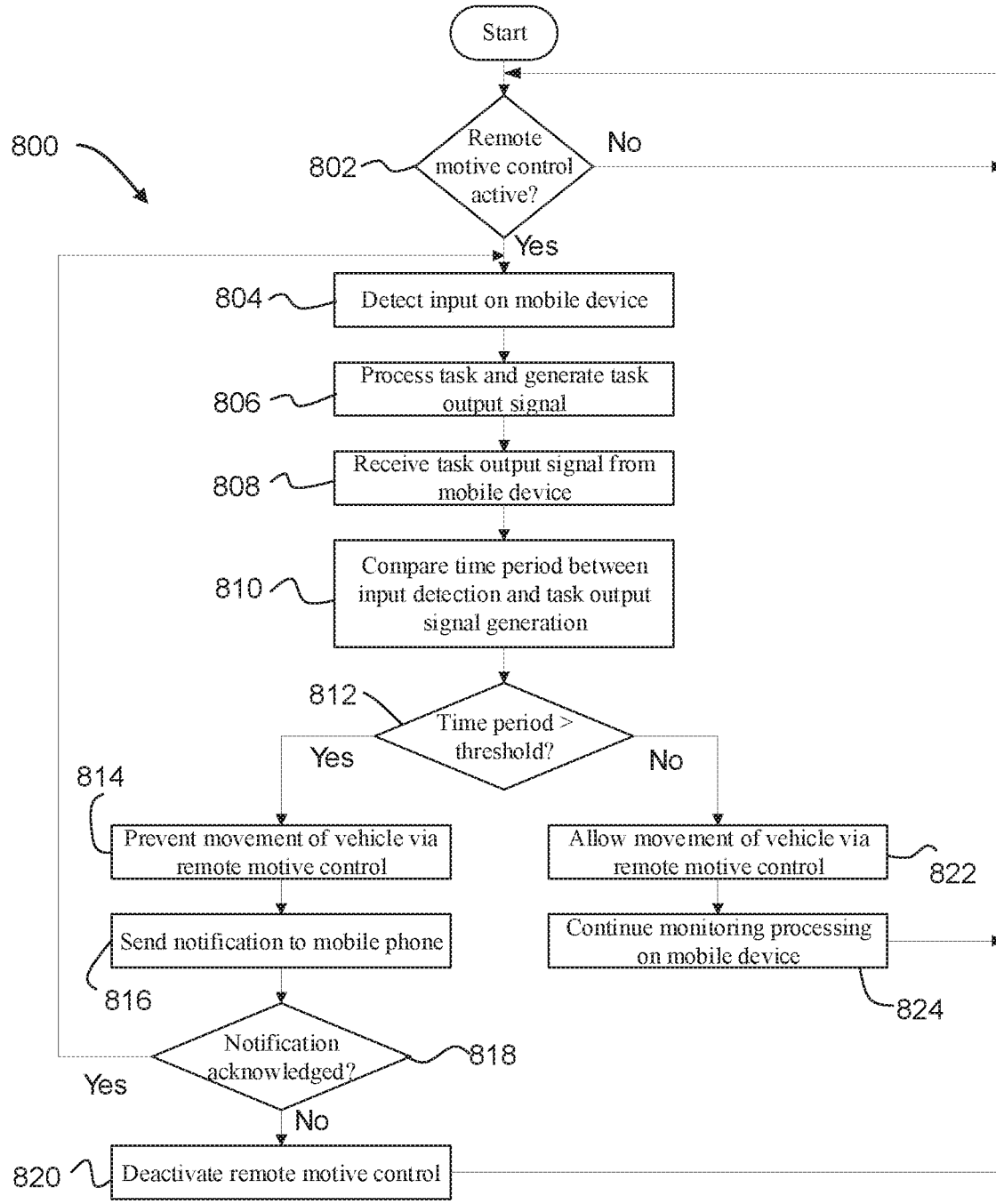
FIG. 8 is a flowchart for monitoring of communication and processing for remote motive control in accordance with the teachings herein.

FIG. 8 is a flowchart of an example method 800 to monitor processing on the mobile device during vehicle remote motive control. The flowchart of FIG. 8 is representative of machine readable instructions that are stored in memory (such as the memory 612 of FIG. 6) and include one or more programs which, when executed by a processor (such as the processor 610 of FIG. 6), cause the vehicle 100 to implement the example autonomy unit controller 122 of FIGS. 1 and 6. While the example program is described with reference to the flowchart illustrated in FIG. 8, many other methods of implementing the example autonomy unit controller 122 may alternatively be used. For example, the order of execution of the blocks may be rearranged, changed, eliminated, and/or combined to perform the method 800. Further, because the method 800 is disclosed in connection with the components of FIGS. 1-6, some functions of those components will not be described in detail below.

Initially, at block 802, the autonomy unit controller 122 determines whether remote parking of the vehicle 100 is active. For example, the autonomy unit controller 122 determines that remote parking is active for the vehicle 100 in response to receiving a remote parking instruction from the mobile device 204, determining that the mobile device 204 is within the tethering range 208 of the vehicle 100, detecting via the engine sensor 108 that the engine 102 is active, and/or detecting via the transmission position sensor 110 that the transmission 104 is not in park. In response to the autonomy unit controller 122 determining that remote parking is not activated, the method 800 remains at block 802. Otherwise, in response to the autonomy unit controller 122 determining that remote parking is activated, the method 800 proceeds to block 804.

At block 804, the mobile device receives an input 304 associated with an instruction or task performed by the mobile device 204 during the active remote motive control session. Following detection of the input 304, at block 806, the mobile device 204 begins processing the task responsive to receipt of the input 304. For example, during initiation of the remote motive control session, the mobile device 204 processes or otherwise performs an unlock procedure to initiate the active remote motive control session. The mobile device 204 generates a second return signal 312 (e.g., task output signal) upon completion of processing and/or otherwise performing the task. In some examples, the mobile device 204 determines a time period (e.g., second time period 314) between detection of the input 304, which represents a start of processing the task, and generation of the second return signal 312, which represents the completion of processing the task associated with the input 304. In such examples, the time period 314 is included in the second return signal 312.

At block 808, the autonomy unit controller 122 receives, via the communication module 118, the second return signal 312 sent by the mobile device 204. At block 810, the autonomy unit controller 122 compares the time period 314 with a mobile device processing threshold (e.g., threshold 316). In some examples, the mobile device processing threshold corresponds with a lower limit of time that is associated with latency in processing of an instruction or task by the mobile device 204.

At block 812, the autonomy unit controller 122 determines whether the time period 314 between detection of the input 304 (e.g., start of task processing) and the generation of the second return signal 312 (e.g., completion of task processing) is greater than the threshold 316. In response to the autonomy unit controller 122 determining that the time 314 period is greater than the threshold 316, the method 800 proceeds to block 714 at which the autonomy unit controller 122 prevents the autonomy unit 120 from causing movement of the vehicle 100 during the remote motive control session. At block 816, the autonomy unit controller 122 sends a notification to the mobile device 204 to indicate to the user 206 that the autonomy unit controller 122 has detected an unacceptable amount of latency in processing by the mobile device 204. For example, the notification sent to the mobile device includes a suggestion to the user 206 that the mobile device 204 is overburdened and not able to process tasks and/or instructions within the threshold 316. In some examples, the notification includes a list of potential sources of the detected overburdening of the mobile device 204, such as but not limited to, the number of applications running in the mobile device 204 background, a list of non-remote motive control applications running in the mobile device 204 background, and other such sources. The notification further includes an acknowledgement input provide confirmation to the autonomy unit controller 122 that the user received the notification and has taken corrective action to address the unacceptable amount of latency in processing by the mobile device 204.

At block 818, the autonomy unit controller 122 determines if the acknowledgment input was received from the user. If the acknowledgement input was received, the method 800 returns to block 804 to repeat the steps of the method 800 and determine if corrective action taken by the user (e.g., close non-remote motive control applications running in the mobile device 204 background) was successful in addressing the detected unacceptable amount of latency in processing by the mobile device 204. In some examples, upon return to block 704, the autonomy unit 120 waits a predetermined time (e.g., 1 to 5 seconds) to repeat the process in order to provide the user an opportunity to look for potential sources of overburden to the mobile device 204. In some examples, if the unacceptable amount of latency in processing by the mobile device 204 persists after a predetermined number of attempts, the method 800 proceeds to block 820 and the current remote motive control session is aborted. Similarly, if the acknowledgment input was not received from the user at block 818, the method 800 proceeds to block 820 and the current remote motive control session is aborted. To restart remote motive control of the vehicle 100, the user 206 subsequently is to reinitiate remote parking of the vehicle 100.

Returning to block 812, in response to the autonomy unit controller 122 determining that the time period is less than or equal to the threshold 316, the method 800 proceeds to block 822 at which the autonomy unit controller 122 enables the autonomy unit 120 to cause movement of the vehicle 100 during the remote motive control session. For example, the remote motive control includes remote parking of the vehicle 100. When the time period is less than or equal to the latency threshold, the autonomy unit 120 autonomously controls motive functions of the vehicle 100 to perform remote parking of the vehicle 100 into an available parking spot (e.g., a parking spot 202) and/or to otherwise autonomously and/or semi-autonomously drive the vehicle 100.

At block 824, the autonomy unit controller 122 continues to monitor the processing of the mobile device 204 during the remote motive control session. Accordingly, the method 800 returns to block 802 to monitor the processing of the mobile device 204 and ensure there is an acceptable amount of latency on processing performed on the mobile device 204 during the active remote motive control session.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a communication module; and
an autonomy unit comprising an autonomy unit controller configured to send a diagnostic signal including a unique identifier, via the communication module, to a mobile device, wherein the mobile device includes a device controller configured to generate a return signal including the unique identifier upon detecting an input responsive to receipt of the diagnostic signal; and
wherein the autonomy unit controller is configured to receive the return signal including the unique identifier from the mobile device, via the communication module, and determine a time period between sending the diagnostic signal and receiving the return signal, and wherein responsive to a determination that the time period is greater than a threshold, the autonomy unit controller disables the autonomy unit to prevent movement of the vehicle during a remote motive control session of the vehicle and sends a notification to the mobile device including a first plurality of potential causes for the time period being greater than the threshold.

2. The vehicle of claim 1, wherein the autonomy unit controller generates a first diagnostic signal time stamp when the diagnostic signal including the unique identifier is sent to the mobile device and the autonomy unit controller generates a second diagnostic signal time stamp when the return signal including the unique identifier is received from the mobile device, and wherein the autonomy unit controller determines the time period between the first diagnostic signal time stamp and the second diagnostic signal time stamp.

3. The vehicle of claim 1, wherein, the communication module is configured to wirelessly communicate via a Bluetooth® low energy protocol, a Classic Bluetooth® protocol, a Wi-Fi® protocol, a Wi-Fi® lower power protocol, and an Ultra-Wide Band (UWB) protocol.

4. The vehicle of claim 1, wherein responsive to determining the time period is less than or equal to the threshold, the autonomy unit controller enables the autonomy unit to cause movement during the remote motive control session of the vehicle.

5. The vehicle of claim 1, wherein the notification further includes an acknowledgement input confirming investigation by a user of one or more of the first plurality of potential causes responsible for the time period being greater than the threshold, and wherein a confirmation response is received by the autonomy unit controller to trigger sending of a second diagnostic signal to the mobile device.

6. The vehicle of claim 1, wherein after the mobile device detects the input, the device controller is to:
process a task associated with the input;
generate a second return signal including the unique identifier; and
send the second return signal to the autonomy unit controller, wherein the autonomy unit controller determines a second time period between receiving the return signal and receiving the second return signal.

7. The vehicle of claim 6, wherein responsive to determining the second time period is greater than a second threshold, the autonomy unit controller disables the autonomy unit to prevent movement during the remote motive control session of the vehicle.

8. The vehicle of claim 7, wherein the autonomy unit controller sends a notification to the mobile device including a second plurality of potential causes responsible for the second time period being greater than the second threshold.

9. The vehicle of claim 8, wherein the notification further includes an acknowledgement input confirming investigation by a user of one or more of the second plurality of potential causes responsible for the second time period being greater than the second threshold, and wherein a confirmation response is received by the autonomy unit controller to trigger sending of a second diagnostic signal to the mobile device.

10. The vehicle of claim 6, wherein responsive to determining the second time period is less than or equal to a second threshold, the autonomy unit controller enables the autonomy unit to cause movement during the remote motive control session of the vehicle.

11. A method performed by a vehicle comprising:
sending, via a communication module of a vehicle, a diagnostic signal including a first diagnostic signal time stamp from an autonomy unit controller of the vehicle to a mobile device;
detecting, by the mobile device, an input responsive to receipt of the diagnostic signal;
generating, by the mobile device, a return signal including the first diagnostic signal time stamp upon detecting the input;
receiving, via the communication module, the return signal including the first diagnostic signal time stamp by the autonomy unit controller of the vehicle;
generating, by the autonomy unit controller, a second diagnostic signal time stamp upon receiving the return signal;
determining, via a processor of the autonomy unit controller, a time period between the first diagnostic signal time stamp and the second diagnostic signal time stamp;
disabling, via the processor of the autonomy unit controller, an autonomy unit from causing movement of the vehicle responsive to determining the time period is greater than a threshold; and
sending, via the communication module, a notification to the mobile device including a first plurality of potential causes for the time period being greater than the threshold.

12. The method of claim 11, wherein a time of the autonomy unit controller is synchronized with a time of the mobile device, and the method further includes, generating, by the mobile device, a first device time stamp upon detecting the input, including the first device time stamp in the return signal, and determining, via the processor of the autonomy unit controller, the time period between the first diagnostic signal time stamp and the first device time stamp.

13. The method of claim 11, wherein responsive to determining the time period is less than or equal to the threshold, enabling, via the processor of the autonomy unit controller, the autonomy unit to cause movement of the vehicle.

14. The method of claim 13, wherein the notification further includes an acknowledgement input confirming investigation by a user of one or more of the first plurality of potential causes responsible for the time period being greater than the threshold.

15. The method of claim 14, further includes receiving a confirmation response, by the autonomy unit controller, confirming investigation by the user of one or more of the first plurality of potential causes responsible for the time period being greater than the threshold, wherein the confirmation response triggers sending a second diagnostic signal to the mobile device.

16. The method of claim 11, wherein detecting the input, by the mobile device, triggers the mobile device to:
   process a task associated with the input;
   generate a second return signal;
   send the second return signal to the autonomy unit controller, wherein the autonomy unit controller generates a third diagnostic signal time stamp upon receiving the second return signal, and wherein the autonomy unit controller determines a second time period between the second diagnostic signal time stamp and the third diagnostic signal time stamp.

17. The method of claim 16, wherein responsive to determining the second time period is greater than a second threshold, the autonomy unit is disabled to prevent movement of the vehicle during remote motive control of the vehicle.

18. The method of claim 17, wherein responsive to determining the second time period is greater than the second threshold, the autonomy unit controller sends a notification to the mobile device including a second plurality of potential causes responsible for the second time period being greater than the second threshold.

* * * * *